May 3, 1960  H. H. P. LEMMERMAN ET AL  2,935,677
THERMOCOUPLE TEMPERATURE MONITOR
Filed Dec. 4, 1956

Inventors:
Harold H. P. Lemmerman,
Weyman S. Crocker,
by Roe D. McBurnett
Their Attorney.

United States Patent Office 2,935,677
Patented May 3, 1960

2,935,677

THERMOCOUPLE TEMPERATURE MONITOR

Harold H. P. Lemmerman, Schenectady, and Weyman S. Crocker, Scotia, N.Y., assignors to General Electric Company, a corporation of New York Application December 4, 1956, Serial No. 626,180

6 Claims. (Cl. 322—2)

This invention relates to a thermocouple temperature monitor and, more particularly, to a thermocouple temperature monitor in which both the hot junction and cold junction of a thermocouple are maintained at substantially constant temperatures by immersion in substantially constant temperature baths.

Temperature monitoring systems are necessary in many applications. For example, in jet aircraft the afterburner cannot be operated above a given temperature without structural damage to it. Therefore, it is necessary to monitor this area to be certain that the afterburner is not operated above the critical temperature. Another use of temperature monitors is in processes which require various operations to be carried out at certain specific temperatures. In such instances it is necessary to constantly monitor the operation to be sure that its temperature remains at the required temperature.

Prior thermocouple temperature monitors using constant temperature baths have been unsatisfactory because of the difficulty in maintaining such baths at a substantially constant temperature. Instead of using the constant temperature baths, it is now the practice to obtain cold or hot junction temperature compensation for a reference thermocouple junction by utilizing a predictable current flowing through a temperature-sensitive network. This means that the circuit for the hot or cold junction of a thermocouple temperature monitoring system is such that it compensates for various changes in the system, such as voltage and ambient temperature, so that the reference thermocouple junction appears to be at a constant temperature. However, the equipment necessary to operate these thermocouple monitors must include either a standard cell or a voltage regulator tube or similar equipment. This equipment is very bulky and is limited in use by the ambient temperatures likely to be present in the desired area or operation to be monitored.

Therefore, it is an object of this invention to provide a novel temperature monitor using thermocouples, which is very compact and not limited by ambient temperatures.

It is a further object of this invention to provide a new and improved temperature monitor using thermocouple junctions as a monitoring system where the reference junctions are maintained at constant temperatures within narrow limits by immersion in substantially constant temperature baths.

In patent application, Serial No. 620,098, for Temperature Control Device, filed November 2, 1956, by the present inventors and assigned to the same assignee as the present invention, there is disclosed a novel constant temperature control device. The device therein disclosed utilizes the isothermal change in volume of a substance while gaining or losing heat of fusion to actuate a volume-sensitive device which turns a heater unit on and off. The present invention employs similar constant temperature devices to maintain the hot junction thermocouple and the cold junction thermocouple at substantially constant temperatures to provide an accurate, compact temperature monitoring system.

As used throughout this specification and in the claims, the term thermocouple junction refers to one of the junctions of a thermocouple. A thermocouple pair refers to two thermocouple junctions connected together so that when each junction is at a different temperature a voltage output is obtained.

In carrying out this invention in one form, housings are provided to contain constant temperature baths, each housing having a bath of a different temperature, the baths comprising substances in a solid-liquid state which undergo isothermal volume changes while gaining or losing heat of fusion. Thermocouple junctions are immersed in these solid-liquid baths and connected in thermocouple pairs to provide a voltage output. One junction of a thermocouple pair is immersed in one of the baths and the other junction is placed in the area whose temperature it is desired to monitor. This last-named thermocouple pair provides another voltage output. All of the thermocouple pairs are so selected that when the temperature of the monitored area is at the correct temperature, the voltage outputs are equal.

This invention will be better understood when considered in the light of the following description taken in connection with the accompanying drawing wherein.

Figure 1:
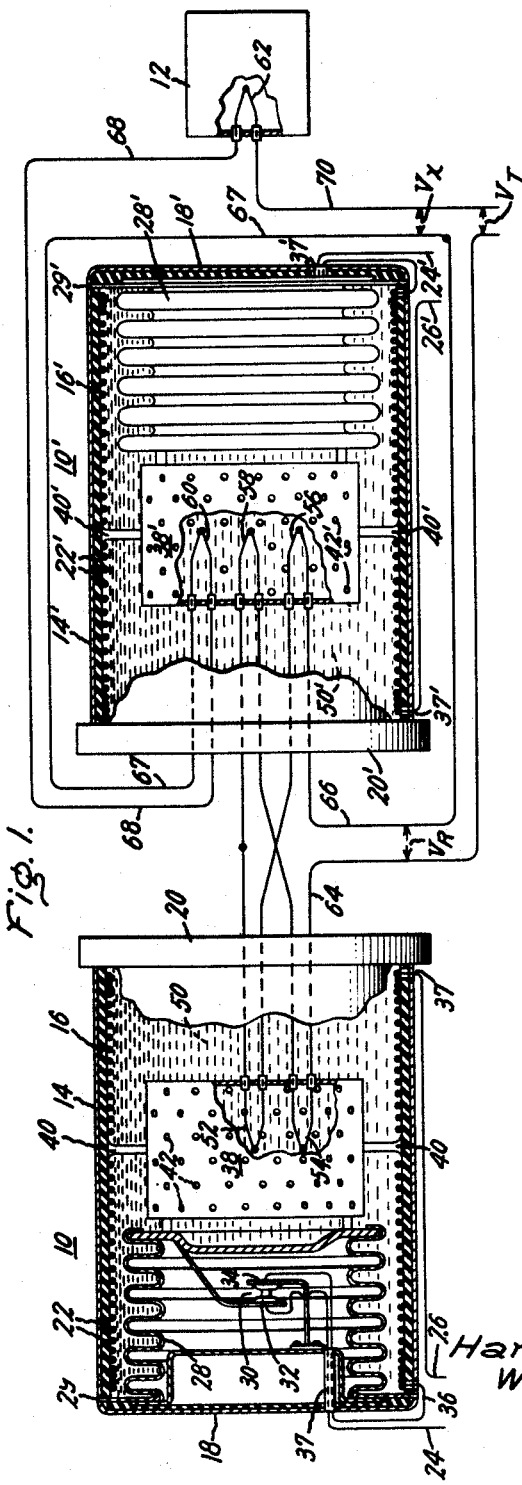
Figure 1 is a schematic diagram partially in section of one form of a temperature monitor system according to the present invention.

Referring to the drawing wherein like numerals are used to indicate like parts throughout and especially with reference to Figure 1, this invention in one form is shown as comprising the units 10 and 10' which provide constant temperature baths at different temperatures for thermocouple junctions mounted in each unit. The units 10 and 10' comprise a temperature monitoring system which is used to monitor the temperature of an area or device represented in Figure 1 by the block 12. Each of the units 10 and 10' are similar in all respects to each other with the exception that one is maintained at a different temperature than the other.

The operation of devices similar to the units 10 and 10' is fully described and claimed in the aforementioned copending application, Serial No. 620,098. The construction and operation of unit 10 will be described, it being understood that the unit 10' is constructed and operates in the same manner.

The constant temperature bath unit 10 comprises a housing 14 of any desired shape; the housing 14 is considered as being in the form of a cylinder for purposes of this description. On the interior wall of the housing 14 is mounted heating insulation means 16. The ends of housing 14 are closed by any desired means. For example, as shown in the drawing, one end is provided with a cap 18, which may be fixed to the end of the housing 14 by welding or in any other desired manner. The other end of housing 14 is shown as closed by the header 20, which may be sealed to the housing 14 in any desired manner. The ends 18 and 20 are also provided with heat insulating means. A heating means shown in the form of a heating coil 22 is mounted within housing 14 adjacent to the insulation means 16. Heating means 22 may be in any desired form, being shown for purposes of illustration as a heating coil with electric current being provided to its opposite ends by means of electric power leads 24, 26, which may be connected to any source of electric current.

Figure 2:
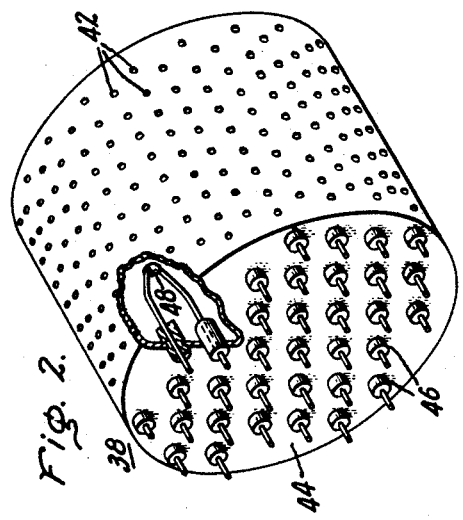
Figure 2 is a prospective view partially in section of a portion of the temperature monitor system shown in Figure 1 showing the detail of a thermocouple junction holder.

Mounted within the housing 14 is a volume-sensitive device, being shown in the form of a metal bellows 28. Bellows 28 is firmly attached to a plate 29, as by welding, and this plate 29 is firmly fixed to the end of housing 14 as shown, sealing the interior of the housing 14. The cap 18 is mounted on the end of housing 14, enclosing the bellows 28. A switching means 30 is mounted within the bellows 28. The switching means 30 is shown as provided with contacts 32, 34, which are opened and closed by operation of the bellows 28. Lead 24, which provides electric current to one end of the heating coil 22, is connected to contact 32 while contact 34 is connected to the end of the heating coil 22, as by lead 36. As the bellows 28 expands, contacts 32 and 34 are engaged thereby energizing heating coil 22 and providing heat to the interior of housing 14. As the bellows member 28 is depressed, contacts 32 and 34 of switch 30 are opened, thus cutting off current to the heating coil 22. All of the leads are brought out of the housing 14 through seals 37, which may be of any desired type as, for example, glass seals, to preserve the insulation of housing 14. Also mounted with the housing 14 is a thermocouple junction holder 38 which is held within the housing 14 by a plurality of mounting studs 40 preferably constructed of some low heat conduction material such as porcelain. The thermocouple junction box may be of any desired shape, a preferred embodiment of holder 38 being more clearly shown in Figure 2. Referring to Figure 2, the thermocouple junction box or holder 38 is shown in cylindrical form and being provided with a plurality of apertures 42 about its periphery. The junction holder 38 is preferably constructed of copper or similar material having a high heat conductive property. Mounted on an end 44 of junction box 38 are a number of electric insulating beads 46. In Figure 2 all of these beads are shown as having thermocouple units mounted therein. However, in practice, only the number of thermocouple units necessary to obtain the desired result will be used. As shown in the sectional portion of the view in Figure 2, a thermocouple junction 48 is mounted in beads 46, the junction 48 being within the junction box 38.

The interior of housing 14 is filled with a substance diagrammatically indicated by the number 50. This substance is in a solid-liquid state at the desired operating temperature of the unit 10 and is one which undergoes an isothermal volume change while gaining or losing heat of fusion. As substance 50 loses heat of fusion, portions of the liquid phase begin to solidify thereby shrinking in volume and allowing the bellows 28 to expand and as substance 50 gains in heat of fusion, the solid portions thereof begin to liquify thereby expanding and depressing the bellows 28. The solid-liquid substance 50 completely surrounds the junction box or holder 38 and extends to the interior thereof through the apertures 42. Thus, the thermocouple junctions indicated at 48 in Figure 2 are maintained at the constant temperature of the substance 50.

The operation of the unit 10 is in the form of a cycle, portions of the substance 50 solidifying when heat of fusion is lost thereby shrinking in volume and allowing the bellows 28 to expand and close contacts 32 and 34. The closing of contacts 32 and 34 of switch 30 energizes the heating coil 22 to provide heat to the substance 50. As the substance 50 absorbs heat of fusion, portions of the solid begin to liquify thereby expanding in volume and causing the bellows 28 to be depressed. The contraction of bellows 28 opens contacts 32 and 34 of switch 30 thereby deenergizing the heating coil 22. Throughout the cycle, the temperature of substance 50 remains substantially constant, the heat from the heating coil 22 being absorbed by the substance as heat of fusion. When the heating coil 22 is off, the substance 50 loses heat of fusion at a constant temperature thereby maintaining the thremocouple junctions mounted within the junction box 38 at a substantially constant temperature. As is pointed out in the abovementioned copending application, Serial No. 620,098, when the substance 50 is naphthalene, the interior of the unit 10 has been held to 79°±.5° C. Obviously, similar substantially constant temperatures can be maintained using other substances which undergo an isothermal volume change during a change of state.

Of course, the unit 10' functions in the identical manner as the unit 10, the substance 50' being one that is at a solid-liquid state at some temperature different than the temperature maintained by unit 10. A number of substances which undergo an isothermal volume change while gaining or losing heat of fusion are set forth in the aforementioned copending application, Serial No. 620,098. Of course, it is understood that any substance which undergoes a large isothermal volume change during a change of state can be used for the solid-liquid substance in units 10 and 10'.

As shown in Figure 1, mounted within unit 10 are the thermocouple junctions 52, 54. These thermocouple junctions may be made of any desired metal such as, for example, chromel and constantan, or palladium and iron. Similarly mounted within the unit 10' are shown three thermocouple junctions 56, 58, and 60. Thermocouple junctions 56, 58 form thermocouple pairs with junctions 52, 54, respectively. Another thermocouple junction 62 is mounted within the area 12 whose temperature it is desired to monitor. The thermocouple pairs 52, 56 and 54, 58 are connected together between thermocouple junctions 52, 58. The combined voltage output of these thermocouple pairs may be measured between lead 64 from thermocouple junction 54 and lead 66 from thermocouple junction 56. This voltage output is indicated in Figure 1 as $V_R$. Lead 66 from thermocouple junction 56 is joined to a lead 67 of thermocouple junction 60. The other lead 68 of thermocouple junction 60 is connected to the similar side of thermocouple junction 62, forming a thermocouple pair. Since thermocouple junctions 60, 62 are connected as a thermocouple pair, there will be a voltage output between the lead 67 of thermocouple 60 and lead 70 of thermocouple 62 if the device or area indicated by block 12 is at a different temperature than the temperature of the unit 10'. This voltage output is indicated in Figure 1 as $V_X$. The difference between the voltage output $V_R$ and $V_X$ is taken at the point indicated at $V_T$ in Figure 1.

The number and kind of thermocouple junctions in units 10 and 10' are so selected such that when the device or area indicated by the block 12 is at the desired or correct temperature, the voltage output $V_R$ will exactly equal the voltage output $V_X$. In such instances the voltage $V_T$ will be zero. However, if the area 12 is higher than the desired temperature then $V_X$ will be some value other than $V_R$. We may arbitrarily assign this as a positive difference. Therefore, the voltage output $V_T$ will be positive, indicating the area 12 is at a higher temperature than the desired temperature. Conversely, if the area 12 is at a temperature lower than the desired temperature, then the voltage output $V_X$ will be less than the voltage output of $V_R$ and $V_T$ will have a voltage of the opposite polarity which may be considered negative. Therefore, by means of the device herein described, the temperature of the area or device indicated by the block 12 can be monitored by the units 10 and 10' and by merely checking the voltage output indicated at $V_T$, it is possible to determine whether the area or device 12 is at the desired temperature and if not, whether it is at a higher or lower temperature than that desired. It will also be possible, if desired, to determine the amount of the temperature difference.

Various modifications will appear obvious to those skilled in the art. The embodiments shown are by way of example only since many substitutions may be made without departing from the spirit and scope of the invention as defined in the appended claims.

What is claimed as new and which is desired to secure by Letters Patent of the United States is:

1. A thermocouple temperature monitor comprising a pair of housings; each housing containing therein a substance in a solid-liquid state, a volume-sensitive device and heating means for maintaining each housing at a different temperature determined by said substance in each housing by means of said volume-sensitive device controlling said heating means in response to a change in volume of said substance; thermocouple junctions immersed in said substance in each said housing, said thermocouple junctions in one housing being connected in thermocouple pairs with said thermocouple junctions in the other housing; a thermocouple junction provided in an area whose temperature it is desired to monitor, said last-named thermocouple junction being connected as a thermocouple pair with a thermocouple junction in one of said housings; all of said thermocouple junctions being selected such that when said area desired to be monitored is at a desired temperature the output of the thermocouple junctions connected as a pair between said area and one of said housings will equal the output of the thermocouple junctions connected in pairs between said housings.

2. A thermocouple temperature monitor comprising a first plurality of thermocouple junctions mounted in a first housing; said housing being maintained at a substantially constant temperature by means of a substance in a solid-liquid state at such temperature, a volume-sensitive device responsive to a volume change of said substance and a heating means to provide heat to said substance, said heating means being energized or deenergized by action of said volume-sensitive device; a second plurality of thermocouple junctions mounted in a second housing; said second housing being maintained at a substantially constant temperature by means of a second substance in a solid-liquid state, which is different than the temperature of said first housing, said first and second plurality of thermocouple junctions being connected in thermocouple pairs to provide an output voltage, a thermocouple junction mounted in an area whose temperature it is desired to monitor, another thermocouple junction mounted in said second housing, said last-named thermocouple junctions being connected as a pair to provide a voltage output, the relation of said constant temperatures and said thermocouple junctions being such that when said voltage outputs are equal said monitored area is at a desired temperature.

3. In a temperature monitor unit to monitor an area of variable temperature to indicate when the area is at a desired temperature, a plurality of housings, each housing containing a substance in solid-liquid form at a temperature different than that prevailing in any other housing of the unit, said substances undergoing isothermal volume changes during gain or loss of heat of fusion, said plurality of housings each having mounted therein, in operative relation with said substance, a volume-sensitive device and a heating unit controlled by said volume-sensitive device, a thermocouple junction holder mounted in each housing and immersed in said substance, a plurality of thermocouple junctions contained in each holder, the thermocouple junctions in one holder connected in thermocouple pairs with the thermocouple junctions in another holder to provide a first voltage output, a thermocouple junction fixed in thermal relation to the area to be monitored, said thermocouple junction being connected in a thermocouple pair with a similar thermocouple junction mounted in one of said holders to provide a second voltage output, means providing a third voltage output which is the algebraic sum of said first and second outputs, said thermocouple junctions being so selected that when said area is at the desired temperature said third voltage output is zero.

4. A thermocouple temperature monitor for monitoring an area comprising a first housing containing a first substance in a solid-liquid state, means for maintaining said substance at a substantially constant temperature, said constant temperature being the temperature at which said substance is in a solid-liquid state, at least one thermocouple junction in thermal relation with said substance, a second housing containing a second substance in a solid-liquid state, means for maintaining said substance at a substantially constant temperature which is different from that of the first substance, said constant temperature being the temperature at which said second substance is in a solid-liquid state, at least one thermocouple junction in thermal relation with said second substance, means connecting said thermocouple junctions to provide a first voltage output, a thermocouple junction fixed in thermal relation to the area to be monitored, another thermocouple junction in thermal relation with the substance in one of said housings, means connecting the last two-named thermocouple junctions to provide a second voltage output, the relation of said constant temperatures and said thermocouple junctions being such that when said voltage outputs are equal, said monitored area is at the desired temperature.

5. A thermocouple temperature monitor as claimed in claim 4 including means to provide a third voltage output which is the algebraic sum of said first and second voltage outputs.

6. A thermocouple temperature monitor as claimed in claim 4 in which each said means for maintaining the substances at substantially constant temperature comprises a heating means and a device responsive to volumetric changes in said substances for controlling said heating means.

References Cited in the file of this patent

UNITED STATES PATENTS

| | | |
|---|---|---|
| 1,265,765 | Ferris | May 14, 1918 |
| 2,528,377 | Maltby | Oct. 31, 1950 |
| 2,595,814 | Rich et al. | May 6, 1952 |